US 7,855,482 B2

(12) United States Patent
Nakamura et al.

(10) Patent No.: US 7,855,482 B2
(45) Date of Patent: Dec. 21, 2010

(54) RECTIFIER WITH IMPROVED RESISTANCE AGAINST VIBRATION

(75) Inventors: Shigenobu Nakamura, Anjo (JP); Masatoshi Koumura, Okazaki (JP)

(73) Assignee: Denso Corporation, Kariya (JP)

( * ) Notice: Subject to any disclaimer, the term of this patent is extended or adjusted under 35 U.S.C. 154(b) by 161 days.

(21) Appl. No.: 12/292,389

(22) Filed: Nov. 18, 2008

(65) Prior Publication Data

US 2009/0134749 A1 May 28, 2009

(30) Foreign Application Priority Data

Nov. 22, 2007 (JP) ............................. 2007-302397

(51) Int. Cl.
*H02K 11/00* (2006.01)
(52) U.S. Cl. ..................... 310/71; 310/68 D
(58) Field of Classification Search .................. 310/71, 310/68 D, 64
See application file for complete search history.

(56) References Cited

U.S. PATENT DOCUMENTS

| 6,958,557 | B2 * | 10/2005 | Shichijyo ................. 310/68 D |
| 2004/0051409 | A1 | 3/2004 | Nakamura et al. |
| 2006/0138882 | A1 | 6/2006 | Sakakibara |
| 2007/0046114 | A1 | 3/2007 | Kondo et al. |

FOREIGN PATENT DOCUMENTS

| JP | U-4-10574 | 1/1992 |
| JP | A-6-113520 | 4/1994 |
| JP | A-2003-169457 | 6/2003 |
| JP | A-2004-112860 | 4/2004 |
| JP | A-2006-191712 | 7/2006 |
| JP | A-2007-068257 | 3/2007 |

OTHER PUBLICATIONS

Japanese Office Action issued in Application No. 2007-302397; mailed on Sep. 29, 2009 with English translation.

* cited by examiner

*Primary Examiner*—Quyen Leung
*Assistant Examiner*—Leda Pham
(74) *Attorney, Agent, or Firm*—Oliff & Berridge, PLC

(57) ABSTRACT

In a rectifier, a high-side heatsink in which high-side rectifying elements are mounted provides a common positive terminal attached to the high-side heatsink. A low-side heatsink in which the low-side rectifying elements are mounted provides a common negative terminal. A terminal block assembly includes a plurality of terminal blocks integrated with each other. The plurality of terminal blocks hold the conductive members. A fixing mechanism directly fixes one of the plurality of terminal blocks to the high-side heatsink. The one of the plurality of terminal blocks holds at least one of the conductive members. The at least one of the conductive members is connected to one of the high-side rectifying elements. The one of the high-side rectifying elements is located closest to the output terminal in all of the high-side rectifying elements.

8 Claims, 7 Drawing Sheets

RECTIFIER WITH IMPROVED RESISTANCE AGAINST VIBRATION

CROSS REFERENCE TO RELATED APPLICATIONS

This application is based on Japanese Patent Application 2007-302397 filed on Nov. 22, 2007. This application claims the benefit of priority from the Japanese Patent Application, so that the descriptions of which are all incorporated herein by reference.

FIELD OF THE INVENTION

The present invention relates to rectifiers for alternating-current (AC) generators; these AC generators are installable in motor vehicles.

BACKGROUND OF THE INVENTION

Rectifiers are operative to rectify alternating-current (AC) power to direct-current (DC) power. Such a rectifier is preferably used together with an AC generator to be installable in motor vehicles.

Specifically, a rectifier used together with an AC generator works to rectify AC power generated by the AC generator to DC power to be used for electric loads.

A rectifier used together with an AC generator installable in motor vehicles is normally provided with at least one rectifying element and a fin-shaped heatsink, such as a cooling fin. The at least one rectifying element is fitted in the cooling fin by pressing it thereinto.

In order to prevent breakage during the press fitting, a rectifier with a portion around a hole in which at least one rectifying element is to be fitted being greater in thickness than another portion is disclosed in US Patent Application Publication No. 2007/0046114A1 corresponding to Japanese Patent Application Publication No. 2007-068257.

On the other hand, automotive AC generators have higher output power with increase in power requirement of electric loads. With increase in power requirement of electric loads, an output line drawn out from an output terminal of an AC generator has a greater cross section so as to suppress the increase in current density through the output line. This results in increasing the weight of the output line.

Rectifiers normally include a plurality of pairs of positive and negative (high-side and low-side) rectifying elements and positive and negative cooling fins in which the positive and negative rectifying elements are mounted, respectively. Normal rectifiers also include a terminal block assembly made up of a plurality of terminal blocks. Leads drawn out from one pair of the positive and negative rectifying elements are joined to a conductive member (preformed metal insert), and the conductive member is connected to one end of a corresponding one phase winding of a stator of the AC generator. The conductive members (preformed metal inserts) for respective pairs of the positive and negative rectifying elements are resin molded to be integrated with each other to form the terminal block.

Each normal rectifier constitutes a bridge circuit for full-wave rectifying a multiphase alternating current, such as three-phase alternating current.

As an output terminal of a rectifier drawn out from the positive cooling fin, which serves as the output terminal of the AC generator, a bolt is normally used so that the terminal of the output line is threadedly fastened to the output terminal of the AC generator with a nut.

The increase in the output power of an AC generator requires the increase in the diameter of the bolt and the increase in the size of the bolt thread to thereby increase the clamping force due to the set of the bolt and nut. This secures the reliability of the electrical connection between the rectifier (AC generator) and the output line.

In such a normal rectifier installed in a motor vehicle together with an AC generator, engine vibrations may be transferred to the output line drawn out from the output terminal of the AC generator. In this situation, vibration load of the output line increases with increase in the diameter and weight of the output line. The vibration load of the output line is carried to the output terminal of the AC generator to which the output line is directly fastened so that the vibration load acts on a portion of the positive cooling fin located adjacent to the output terminal of the AC generator.

The vibration load acting on the portion of the positive cooling fin located adjacent to the output terminal of the AC generator applies vibration load to a positive rectifying element located close to the portion of the positive cooling fin.

A difference between the vibration phase of a conductive member connected to the positive rectifying element located close to the portion of the positive cooling fin located adjacent to the output terminal of the AC generator and that of the positive cooling fin may cause vibration load to periodically act on the positive rectifying element via its lead connected to the conductive member. This may damage the positive rectifying element, and/or reduce the life thereof.

In order to suppress the increase in current density through the output line without increasing in the diameter thereof, the AC generator has a higher output voltage. This approach however may cause new problems, such as increase in leakage current inside either the AC generator or each electric load, occurrence of arc discharge, and the like.

The increase in the size of the bolt thread so as to provide sufficient rigidity to the connection between the terminal of the output line and the output terminal of the AC generator may apply load on the positive cooling fin located adjacent to the output terminal of the AC generator. Cooling fins are normally manufactured from a pressing-processable or diecasting-moldable flexible material, such as aluminum or copper so that they are deformable. For this reason, the load applied to the positive cooling fin may result in deformation of the positive cooling fin.

This may damage the positive rectifying elements fitted in the positive cooling fin, and/or reduce the life of each of the positive rectifying elements.

SUMMARY OF THE INVENTION

In view of the circumstances set force above, an object of an aspect of the present invention is to provide a rectifier with an output terminal and a rectifying element located therearound, this rectifier has an improved structure that reduces at least one of: the possibility of breakage of the rectifying element and that of reduction of the life thereof.

According to one aspect of the present invention, there is provided a rectifier for an alternating-current generator installable in a motor vehicle. The rectifier includes an output terminal and a plurality of pairs of high-side and low-side rectifying elements. One of the high-side rectifying elements and a corresponding one of the low-side rectifying elements of each pair is connected to each other. The plurality of pairs of high-side and low-side rectifying elements work to rectify alternating-current power to direct-current power. The direct-current power is outputted from the output terminal. The rectifier includes a high-side heatsink in which the high-side rectifying elements are mounted so as to provide a common positive terminal. The output terminal is attached to the high-side heatsink. The rectifier includes a low-side heatsink in which the low-side rectifying elements are mounted so as to provide a common negative terminal, and a terminal block assembly including a plurality of terminal blocks integrated with each other. The plurality of terminal blocks hold the conductive members. The rectifier includes a fixing mechanism configured to directly fix one of the plurality of terminal blocks to the high-side heatsink. The one of the plurality of terminal blocks holds at least one of the conductive members. The at least one of the conductive members is connected to one of the high-side rectifying elements. The one of the high-side rectifying elements is located closest to the output terminal in all of the high-side rectifying elements.

According to another aspect of the present invention, there is provided a rectifier for an alternating-current generator installable in a motor vehicle. The rectifier includes an output terminal, and a plurality of pairs of high-side and low-side rectifying elements. One of the high-side rectifying elements and a corresponding one of the low-side rectifying elements of each pair are connected to each other. The plurality of pairs of high-side and low-side rectifying elements work to rectify alternating-current power to direct-current power. The direct-current power is outputted from the output terminal. The rectifier includes a high-side heatsink in which the high-side rectifying elements are mounted so as to provide a common positive terminal. The output terminal is attached to the high-side heatsink. The rectifier includes a low-side heatsink in which the low-side rectifying elements are mounted so as to provide a common negative terminal, and a terminal block assembly including a plurality of terminal blocks integrated with each other. The plurality of terminal blocks hold the conductive members. A portion of the high-side heatsink has one surface on which the output terminal is attached, and the one of the plurality of terminal blocks has one surface. The high-side heatsink and the terminal block assembly are arranged such that the one surface of the one of the plurality of terminal blocks is mounted on the one surface of the portion of the high-side heatsink. The portion of the high-side heatsink has a thickness greater than a thickness of a remaining portion of the high-side heatsink.

According to a further aspect of the present invention, there is provided a rectifier for an alternating-current generator installable in a motor vehicle. The rectifier includes an output terminal, and a plurality of pairs of high-side and low-side rectifying elements. One of the high-side rectifying elements and a corresponding one of the low-side rectifying elements of each pair are connected to each other. The plurality of pairs of high-side and low-side rectifying elements work to rectify alternating-current power to direct-current power. The direct-current power is outputted from the output terminal. The rectifier includes a high-side heatsink in which the high-side rectifying elements are mounted so as to provide a common positive terminal. The output terminal is attached to the high-side heatsink. The rectifier includes a low-side heatsink in which the low-side rectifying elements are mounted so as to provide a common negative terminal, and a terminal block assembly including a plurality of terminal blocks integrated with each other. The plurality of terminal blocks hold the conductive members. The rectifier includes a reinforcing member mounted on a portion of the high-side heatsink close to the output terminal and working to increase rigidity of the portion of the high-side heatsink close to the output terminal.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1:
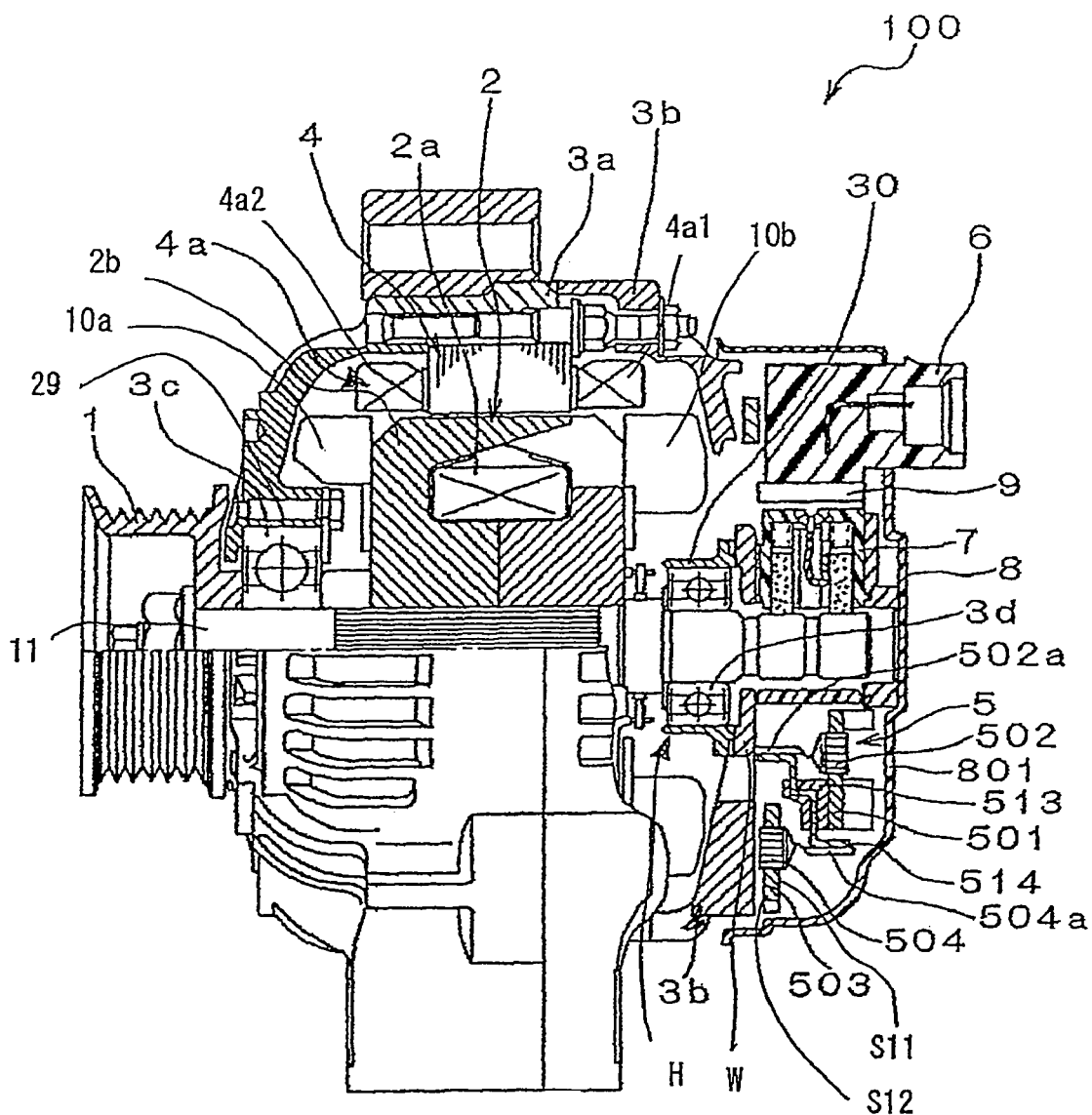
FIG. 1 is a partially axial sectional view illustrating an alternator according to a first embodiment of the present invention.

Referring to the drawings, in which like reference characters refer to like parts in several views, particularly to FIG. 1, there is illustrated an alternator 100 for vehicles, as an example of AC generators.

The alternator 100 installed in, for example, an engine compartment of a motor vehicle includes a rotor 2, a frame 3, a stator 4, a rectifier 5, a connector case 6, a brush assembly 7, slip rings SR, a rear end cover 8, a regulator 9, a cooling fan 10a, a centrifugal cooling fan 10b, and so on.

The rotor 2 is disposed within the frame 3 to be attached to a rotary shaft 11. One end of the rotary shaft 11 is linked to a pulley 1 such that the rotary shaft 11 is rotatably driven through the pulley 1 by an engine (not shown) installed in the engine compartment.

Specifically, the rotor 2 is made up of, for example, a field coil 2a and a Lundell type (claw pole) core 2b. The pole core 2b has a pair of opposing circular plates axially assembled to the rotary shaft 11 and a number of, for example, six claw portions extending from the outer peripheral side of each of the circular plates. The claw portions of one of the circular plates and those of the other thereof are alternatively arranged in the circumferential direction of the rotor 2.

The field coil 2a consists of, for example, an insulating-film-coated copper wire and is so mounted between the circular plates of the pole core 2b as to be concentrically wound around the rotary shaft 11 in the form of a cylinder. The slip rings SR and a pair of brushes 7a of the brush assembly 7 are configured to provide electrical connections between the field coil 2a and a power supply (battery).

The cooling fan 10a and the centrifugal cooling fan 10b are respectively mounted on the external end surfaces of the circular plates of the pole core 2b by, for example, welding. The alternator 100 is arranged in the engine compartment such that the one end of the rotary shaft 11 linked to the pulley 1 is directed to the front side of the vehicle.

The cooling fan 10a serves as, for example, an axial flow fan. Specifically, when being rotated with rotation of the pole core 2b, the cooling fan 10a works to inhale cooling air from the front side of the vehicle into the frame 3, deliver the inhaled cooling air in the axial direction of the rotary shaft 11 and in radial directions thereof, and exhaust the delivered cooling air from the frame 3.

When being rotated with the rotation of the pole core 2b, the centrifugal fan 10b works to inhale cooling air from the rear side of the vehicle into the frame 3, deliver the inhaled cooling air in the radial direction of the rotary shaft 11, and exhaust the delivered cooling air from the frame 3.

The stator 4 is made up of a stator coil 4a and a stator core 4b fixed to an inner peripheral wall of the frame 3.

The stator core 4b has, for example, a substantially annular shape and first and second annular axial end surfaces. The stator core 4b also has, for example, a plurality of groove-like slots formed on an inner wall surface of the stator core 4b.

The slots are formed through the stator core 4b in its axial direction (length direction) and are circumferentially arranged at given intervals.

The stator coil 4a consists of, for example, three-phase (U-, V-, and W-phase) windings connected in star or delta configuration as an example of single-phase or multi-phase windings. For example, each of the U-, V-, and W-phase windings has one and the other ends, the one ends of the U-, V-, and W-phase windings are electrically connected to each other in delta configuration, the connecting point serving as a neutral point. The other ends of the U-, V-, and W-phase windings serve as phase output terminals.

The three-phase windings are inserted in the corresponding slots of the stator core 4a so that each of the three-phase windings is concentrically and cylindrically wound therearound to provide the stator coil 4a.

The stator coil 4a has first and second coil end portions 4a1 and 4a2 axially opposing each other. The first and second coil end portions 4a1 and 4a2 project from the first and second axial end surfaces of the stator core 4b toward the front and rear sides of the vehicle, respectively.

For example, the phase output terminals of the three-phase windings of the stator coil 4a are drawn out from, for example, one of the second coil end portion 4a2 of the stator coil 4a.

As illustrated in FIG. 1, the stator 4 is arranged in the frame 3 such that the first coil end portion 4a1 faces the rear end cover 8 and the second coil end portion 4a2 faces the front side of the vehicle.

The frame 3 is configured to accommodate the rotor 2 and the stator 4 such that the stator core 4b is fixedly disposed around the outer periphery of the pole core 2b in which the inner periphery of the stator core 4b is opposite to the outer periphery of the pole core 2b with a predetermined air gap.

Specifically, the frame 3 is composed of a front frame 3a and a rear frame 3b located respectively at the front and rear sides in the axial direction of the rotary shaft 11. The front frame 3a and the rear frame 3b are fastened to each other by a plurality of fastening bolts. This fastening structure fixedly supports the stator 4 in the frame 3.

Each of the front and rear frames 3a and 3b has a substantially bowl-shaped structure.

Specifically, the front frame 3a has a substantially circular end wall with a hole at the center thereof in which one end portion of the rotary shaft 11 is rotatably supported in the hole by a bearing 3c fixedly housed in a tubular bearing box 29 integrally formed in the front frame 3a.

The front frame 3a also has an annular side wall extending from the periphery of the circular end wall in parallel to the axial direction of the rotary shaft 11.

The rear frame 3b has a substantially circular end wall W with a hole H at the center thereof in which the other end portion of the rotary shaft 11 is rotatably supported in the hole H by a bearing 3d fixedly housed in a tubular bearing box 30 integrally formed in the rear frame 3b.

Outer peripheral edges of the front and rear frames 3a and 3b are arranged opposing each other with a space therebetween.

The circular end wall of the front frame 3a is formed with a number of intake windows disposed opposing the cooling fan 10a so that cooling air can be inhaled into the frame 3 from the front side thereof.

Similarly, the circular end wall W of the rear frame 3b is formed with a number of intake windows therethrough. The intake windows are disposed opposing the centrifugal fan 10b so that cooling air can be inhaled into the frame 3 from the rear side thereof.

The front frame 3a is also formed at its, for example, annular side wall with a plurality of discharge windows. The discharge windows are disposed opposing the front-side coil end so that the inhaled cooling air can be discharged therethrough out of the frame 3 (alternator 1).

Similarly, the rear frame 3b is also formed at its, for example, annular side wall with a plurality of discharge windows. The discharge windows are disposed opposing the rear side coil end so that the inhaled cooling air can be discharged therethrough out of the frame 3 (alternator 1).

The rear end cover 8 has a substantially bowled shape formed by, for example, molding from a resin material. The rear end cover 8 is disposed to be putted over the rear frame 3b to protect the rectifier 5, the brush assembly 7, and the regulator 9.

The rectifier 5 is made up of a number of, for example, twelve diodes in full-bridge configuration, which will be described hereinafter.

The rectifier 5 is electrically connected to three stator leads extending from the ends of the three-phase windings of the stator coil 4a drawn out from the front side coil end portion thereof.

The rectifier 5 is configured to convert a three-phase AC (Alternating Current) voltage applied from the three-phase windings of the stator coil 4a into a DC voltage using both positive and negative half cycles of the three-phase AC voltage. The DC voltage is configured to be output from the alternator 100 via an output terminal thereof as an output voltage.

The connector case 6 includes a terminal holder 6a in which first terminals 6b are contained, and a pair of second terminals 6c. The first and second terminals 6b and 6c are formed by means of, for example, insert molding to be integrated with each other to provide the connector case 6.

The first and second terminals 6b are arranged to electrically connect between the regulator 9 and electric components installed in the motor vehicle. The second terminals 6c are also arranged to fixedly mount the connector case 6 on the rectifier 5.

Specifically, in the alternator 100 set forth above, a field current is applied to the field coil 2a through the slip rings SR and the brushes 7a while the field coil 2a of the rotor 2 is rotating based on torque applied from the engine through the pulley 1. In this situation, the field current flowing through the field coil 2a magnetizes the claw portions of one of the circular plates to the north (N) pole, and those of the other thereof to the south (S) pole.

The rotation of the alternately magnetized north and south poles create magnetic fluxes, and the created magnetic fluxes induce a three-phase AC voltage in the stator coil 4a. The induced three-phase AC voltage is full-wave rectified by the rectifier 5, thereby generating a DC voltage (output voltage). The regulator 9 is configured to control the field current flowing through the field coil 2a depending on the alternator output voltage.

An example of the structure of the rectifier 5 will be described hereinafter.

Figure 2:
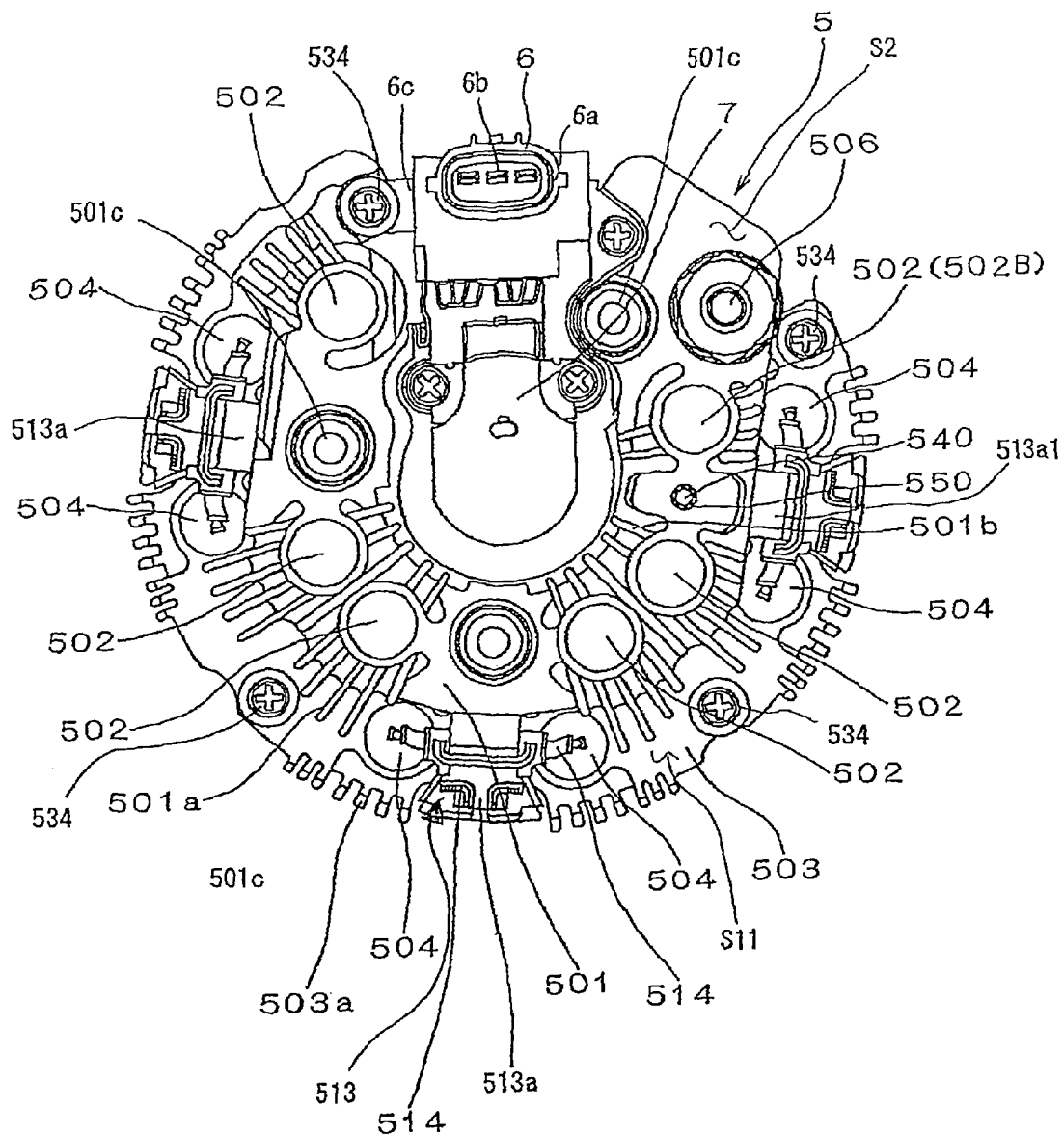
FIG. 2 is a plan view of a rectifier installed in the alternator illustrated in FIG. 1 when it is viewed from the rear side thereof with a rear end cover being removed according to the first embodiment.

FIG. 2 schematically illustrates the rectifier 5 when it is viewed from the rear side thereof facing the rear end cover 8.

The rectifier 5 includes a pair of positive and negative fin-shaped heatsinks 501 and 503 each with a substantially U-shape (horseshoe shape); these positive and negative heatsinks 501 and 503 respectively serve as positive and negative electrodes of the rectifier 5. The positive and negative heatsinks 501 and 503 are coaxially arranged in an axial direction of the rotary shaft 11 such that the positive heatsink 501 is located to be closer to the rear end cover 8 than the negative heatsink 503 in the axial direction of the rotary shaft 11.

The rectifier 5 also includes a plurality of, for example, six positive (high-side) rectifying elements 502, a plurality of, for example, six negative (low-side) rectifying elements 504, and a terminal block assembly 513. Three positive rectifying elements 502 are paired to corresponding three negative rectifying elements 504, respectively, for providing a first three-phase full-bridge rectifier circuit. The remaining three positive rectifying elements 502 are paired to corresponding three negative rectifying elements 504, respectively, for providing a second three-phase full-bridge rectifier circuit.

Figure 5:
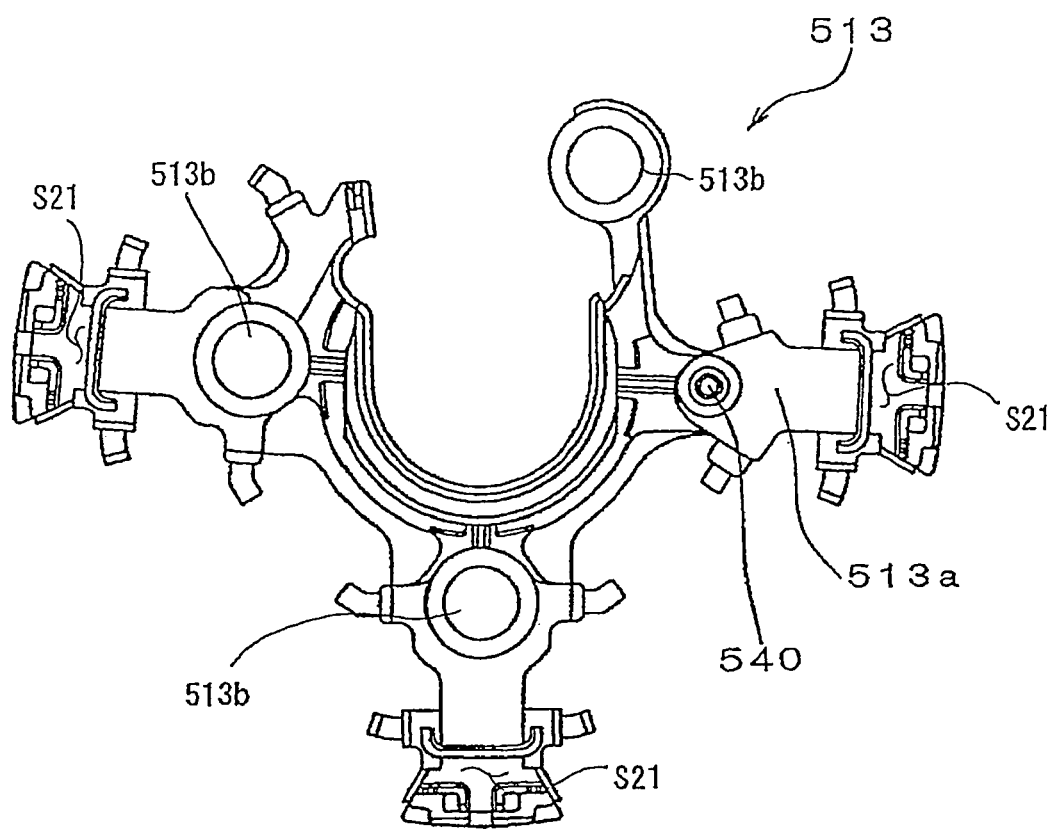
FIG. 5 is an enlarged plan view schematically illustrating a terminal block assembly illustrated in FIG. 1.

The terminal block assembly 513 has a substantially U-shape (horseshoe shape) frame and a number of, for example, three terminal blocks 513a radially extending therefrom at regular intervals therebetween (see FIG. 5). The terminal blocks 513a are formed and integrated as the terminal block assembly 513 by, for example, molding an insulating plastic material, such as a polyphenylene sulfide around preformed metal inserts. The metal insets serve as conductive members 514 (AC terminals) for supplying an AC voltage generated by the stator coil 4a to the positive and negative rectifying elements 502 and 504.

Each of the positive rectifying elements 502 has a lead 502a drawn from a negative electrode thereof, and each of the negative rectifying elements 504 has a lead 504a drawn from a positive electrode thereof.

The positive rectifying elements 502 are fixedly mounted in respective through holes formed in the positive heatsink 501 at intervals therebetween such that their positive electrodes are electrically connected to the positive heatsink 501 and their leads 502a project from one major surface S1 opposing the rear end cover 8 toward the negative heatsink 503. This allows the positive heatsink 501 to serve as a common positive terminal of the positive rectifying elements 502.

Similarly, the negative rectifying elements 504 are fixedly mounted in respective through holes formed in the negative heatsink 503 at intervals therebetween such that their negative electrodes are electrically connected to the negative heatsink 503 and their leads 504a project from one major surface S11 opposing the rear end cover 8 toward the positive heatsink 501. This allows the negative heatsink 503 to serve as a common negative terminal of the negative rectifying elements 504.

For example, the positive heatsink 501 is provided with six fitting holes formed therethrough and located at predetermined positions. Each of the positive rectifying elements 502 is driven to be fitted in a corresponding one of the fitting holes such that the lead 502a projects from the first major surface S1 toward the negative heatsink 503.

Similarly, the negative heatsink 503 is provided with six fitting holes formed therethrough and located at predetermined positions. Each of the negative rectifying elements 504 is driven to be fitted in a corresponding one of the fitting holes such that the lead 504a projects from the first major surface S11 toward the positive heatsink 501.

The lead 502a of each of the positive rectifying elements 502 and the lead 504a of a corresponding one of the negative rectifying elements 504 for the first three-phase full-wave rectifier circuit are electrically connected to each other via a corresponding at least one of the conductive members 514 held in a corresponding one of the terminal blocks 513a to thereby provide the first three-phase full-wave rectifier circuit.

Similarly, the lead 502a of each of the positive rectifying elements 502 and the lead 504a of a corresponding one of the negative rectifying elements 504 for the second three-phase full-wave rectifier circuit are electrically connected to each other via a corresponding at least one of the conductive members 514 held in a corresponding one of the terminal blocks 513a to thereby provide the second three-phase full-wave rectifier circuit.

The positive heatsink 501 serving as the common positive electrode of each of the first and second three-phase full-wave rectifying circuits and the negative heatsink 503 serving as the common negative electrode of each of the first and second three-phase full-wave rectifying circuits allow the first and second rectifier circuits to be connected in parallel to each other.

The rectifier 5 includes a metal bolt 506 attached to a portion of the other major surface S2 of the positive heatsink 501 close to one end thereof. The bolt 506 extends from the other major surface S2 in the axial direction of the rotating shaft 11. The bolt 506 serves as an output terminal of the rectifier 5.

Specifically, when the three-phase AC voltage induced by the stator coil 4a is full-wave rectified by the rectifier 5 to thereby generate a DC voltage, the DC voltage is drawn out from the output terminal 506 of the rectifier 5 as an output voltage of the alternator 100.

The negative heatsink 503, the terminal block assembly 513, and the positive heatsink 501 are fixedly mounted on an outer surface of the circular end wall W of the rear frame 3b by a number of, for example, three pairs of bolts 31 and nuts 32 such that:

the negative heatsink 503, the terminal block assembly 513, and the positive heatsink 501 are laminated in this order from the outer surface of the end wall W of the rear frame 3b toward the rear end cover 8.

The end wall W of the rear frame 3b is formed with a number of, for example, three fitting holes 35 therethrough in its axial direction.

Figure 3:
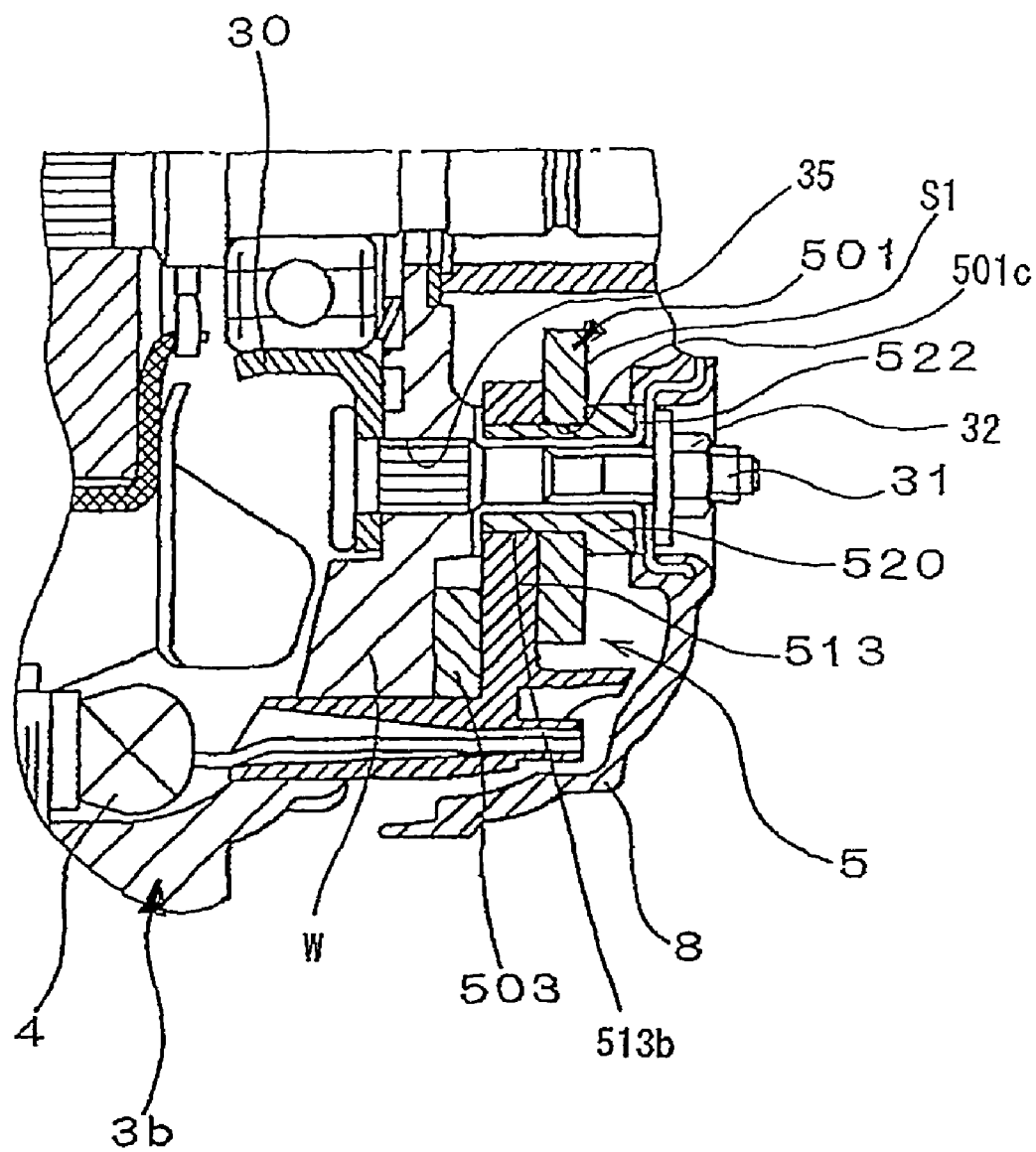
FIG. 3 is a partially axial sectional view schematically illustrating part of the rectifier according to the first embodiment.

The positive heatsink 501 is formed with a number of, for example, three fitting holes 501c therethrough aligned with the three fitting holes 35. The terminal block assembly 513 is also formed with a number of, for example, three fitting holes 513b therethrough aligned with the three fitting holes 35 (see FIG. 3).

The positive heatsink 501 is mounted on one end surface S21 of each terminal block 513a such that each of the fitting holes 501c is aligned with a corresponding one of the fitting holes 513b.

A tubular (pipe) rivet 522 is fitted in each pair of one fitting hole 513b of the terminal block assembly 513 and a corresponding one fitting hole 501c of the positive heatsink 501 aligned therewith. A tubular insulating sleeve 520 having at its one end a flange is so fitted in each pair of one fitting hole 513b of the terminal block assembly 513 and a corresponding one fitting hole 501c of the positive heatsink 501 aligned therewith as to cover the outer circumference of the tubular rivet 522. Both heads of the rivet 522 are flanged to abut on the tubular insulating sleeve 520 to thereby integrate the positive heatsink 501 and the terminal block assembly 513.

The terminal block assembly 513 is mounted at the other end surface S22 of each terminal block 513a on the one major surface S11 of the negative heatsink 503. The negative heatsink 503 is mounted at the other major surface S12 on the outer surface of the end wall W of the rear frame 3b.

Figure 4:
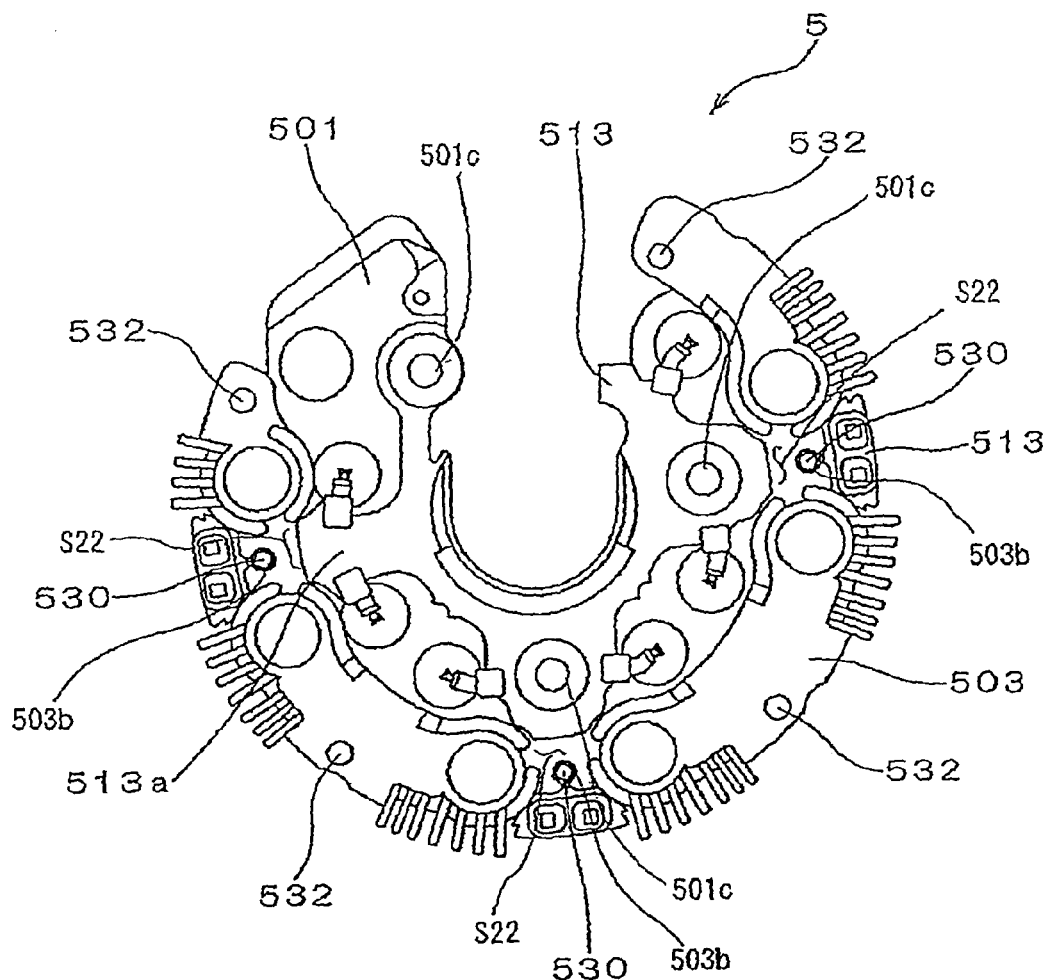
FIG. 4 is one side view of the rectifier when it is viewed from a rear frame side thereof according to the first embodiment.

FIG. 4 schematically illustrates the rectifier 5 when it is viewed from a rear frame side thereof.

Referring to FIG. 4, the negative heatsink 503 is formed with a number of, for example, three location holes 503b therethrough. The terminal block assembly 513 is formed at the other end surfaces S22 of the terminal blocks 513a with a number of, for example, three projections 530 along the axial direction of the rotary shaft 11; these projections are located in alignment with the respective location holes 503b of the negative heatsink 503.

Specifically, the terminal block assembly 513 integrated with the positive heatsink 503 is mounted on the one surface S11 of the negative heatsink 503 such that each of the projections 530 of the terminal block assembly 513 is filled in a corresponding one of the location holes 503b of the negative heatsink 503.

The negative heatsink 503 is formed with a number of, for example, four through holes 532, and the end wall W of the rear frame 3b is formed therein with a number of, for example, four female screw holes (not shown) located in alignment with the respective through holes 532.

Four screw bolts 534 are penetrated through the corresponding through holes 532 so as to be engaged with the corresponding female screw holes. This allows the negative heatsink 503 is fixedly mounted on the end wall W of the rear frame 3b.

The three bolts 31 are inserted in the three fitting holes 35 of the rear frame 3b from the inside of the rear frame 3b to be fitted therein such that their heads are mounted on an inner surface of the rear frame 3b. The three bolts 31 are inserted in the corresponding three fitting holes 513b of the terminal block assembly 513 and the corresponding three fitting holes 501c of the positive heatsink 501 to be fitted therein. One end of each bolt 31 opposing its head projects from one flanged end of a corresponding one pipe rivet 522 mounted on the flange of the tubular insulating sleeve 520.

The rear end cover 8 is formed with a number of, for example, three fitting holes therethrough. The rear end cover 8 is arranged such that each of the three fitting holes is fitted in the projecting end of a corresponding one of the bolts 32. The projecting end of each of the bolts 32 further projects from a corresponding one of the fitting holes of the rear end cover 8.

Each of the nuts 32 is fitted in the projecting end of a corresponding one of the bolts 32 to be tightened securely. This fixedly mounts the negative heatsink 503, the terminal block assembly 513, the positive heatsink 501, and the rear end cover 8 on the outer surface of the end wall 3c of the rear frame 3b.

As described above, one of the flanged ends of each of the pipe rivets 522 in abutment on the outer surface of the end wall W of the rear frame 3b serves as a frame-contact portion of the integrated positive heatsink 501 and the terminal block assembly 513. Each of the insulating sleeves 520 works to electrically insulate between a corresponding one pair of bolts 31 and nuts 31 and the positive heatsink 501.

The rear end cover 8 is formed with a plurality of openings 801 located close to the positive rectifying elements 5021; these openings 801 allow cooling air to be entered inside the rear end cover 8. The positive heatsink 501 is formed at the other major surface S2 thereof with a plurality of ribs 501a and 501b.

The ribs 501a are radially located on the inner peripheral portion of the other major surface S2 of the positive heatsink 501 close to the positive rectifying elements 502 so as to project in the axial direction of the rotary shaft 11 toward the rear end cover 8. An outermost end of each of the ribs 501a is preferably folded toward the rear end cover 8.

The ribs 501b are also radially located on the inner peripheral portion of the other major surface S2 of the positive heatsink 501 close to the positive rectifying elements 502 so as to project in the axial direction of the rotary shaft 11 toward the rear end cover 8. An outermost end of each of the ribs 501b is preferably folded toward the rear end cover 8.

This allows each of the positive rectifying elements 502 to be surrounded by the radially extending ribs 501a and 501b. The outer edge of each of the ribs 501b projects from the outer edge of the positive heatsink 501. The ribs 501a and 501b are arranged to clear the positive rectifying elements 502.

The arrangement of the ribs 501a and 501b allows cooling air entered from the openings 801 to concentratedly flow through the positive rectifying elements 502, and allows the cooling area of the positive heatsink 501 to increase. This makes it possible to effectively cool the positive rectifying elements 502.

The negative heatsink 503 is formed at the outer circumference with a plurality of sub-fins 503a radially extending from the remaining position thereof to thereby increase the cooling area of the negative heatsink 503.

In addition, the rectifier 5 according to the first embodiment is configured such that:

one terminal block 513a1 that holds the conductive member 514 connected to one positive rectifying element 502B located closest to the output terminal 506 in all of the positive rectifying elements 502 is directly fixed to the positive heatsink 501 by at least one of various means.

For example, in the first embodiment, the terminal block assembly 513 is formed with a projection 540 on the one end surface S21 of the one terminal block 513a1 toward the positive heatsink 501.

Figure 6A:
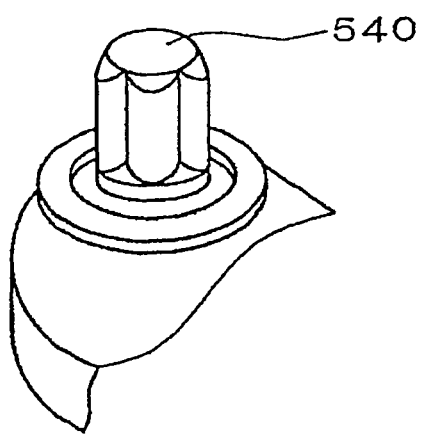
FIG. 6A is an enlarged perspective view of a projection formed on the terminal block assembly illustrated in FIG. 5.

Referring to FIGS. 5 and 6A, the projection 540 has a substantially tubular shape. The projection 540 is, for example, formed to be integrated with the terminal block assembly 513.

The positive heatsink 501 is formed with a through hole 550 located close to the one positive rectifying element 502B in alignment with the projection 540. For example, the through hole 550 is located within a range of the positive heatsink 501; this range is located closer to the output terminal than an alternative one positive rectifying element 502 that is second closest to the output terminal in all of the positive rectifying elements (see FIG. 2).

Figure 6B:
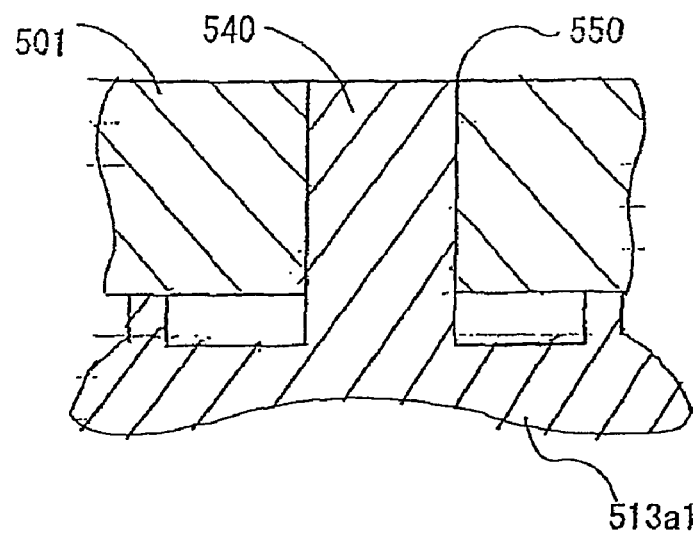
FIG. 6B is an enlarged cross sectional view of a direct joint portion between the projection and a through hole formed in a positive heatsink of the rectifier according to the first embodiment.

Specifically, the terminal block assembly 513 is mounted at the other end surface S22 of each terminal block 513a on the one major surface S11 of the negative heatsink 503 such that the projection 540 is fitted in the through hole 550 of the positive heatsink 501. This results in the one terminal block 513a1 being directly fixed to the positive heatsink 501 (see FIGS. 5 and 6B). For example, during the terminal block assembly 513 being mounted at the other end surface S22 of each terminal block 513a on the one major surface S11 of the negative heatsink 503, the projection 540 is pressed to be fitted in the through hole 550 of the positive heatsink 501.

Note that, in the first embodiment, the through hole 550 is located in the positive heatsink 501 across the one positive rectifying element 502B from the output terminal 506. As a modification, the through hole 550 can be located between the one positive rectifying element 502B and the output terminal 506 when an enough space therebetween can be secured in the positive heatsink 501. As an additional modification, a plurality of pairs of the through holes 550 and the projections 540 can be provided in the rectifier 5.

The pair of through hole 550 and the projection 540 being fitted therein directly secures the one terminal block 513a1 to the positive heatsink 501; this one terminal block 513a1 holds the conductive member 514 connected to the one positive rectifying element 502B located closest to the output terminal 506 in all of the positive rectifying elements 502. This allows, when a vibration load of an output line threadedly fastened to the output terminal 506 is carried via the output terminal 506 to act on the positive heatsink 501, the vibration phase of elements fixed to the one terminal block 513a1 to be matched with that of elements fixed to the positive heatsink 501.

This makes it possible to, even if a vibration load of an output line connected to the output terminal 506 is carried via the output terminal 506 to act on the positive heatsink 501, reduce cyclic vibration load; this cyclic vibration load acts on the one rectifying element 502B via its lead 502a and the conductive member 514 connected to the lead 502a due to the vibration load of the output line. Thus, it is possible to prevent the one positive rectifying element 502B from being damaged due to the vibration load applied to the output terminal 506, and to maintain, at a high level, the life of the one positive rectifying element 502B.

In the first embodiment, as one of the various means, fitting of the projection 540 in the through hole 550 provided in the positive cooling fin 501 allows the one terminal block 513a1 to be directly fixed to the positive cooling fin 501. The present invention is however not limited to the structure.

Figure 6C:
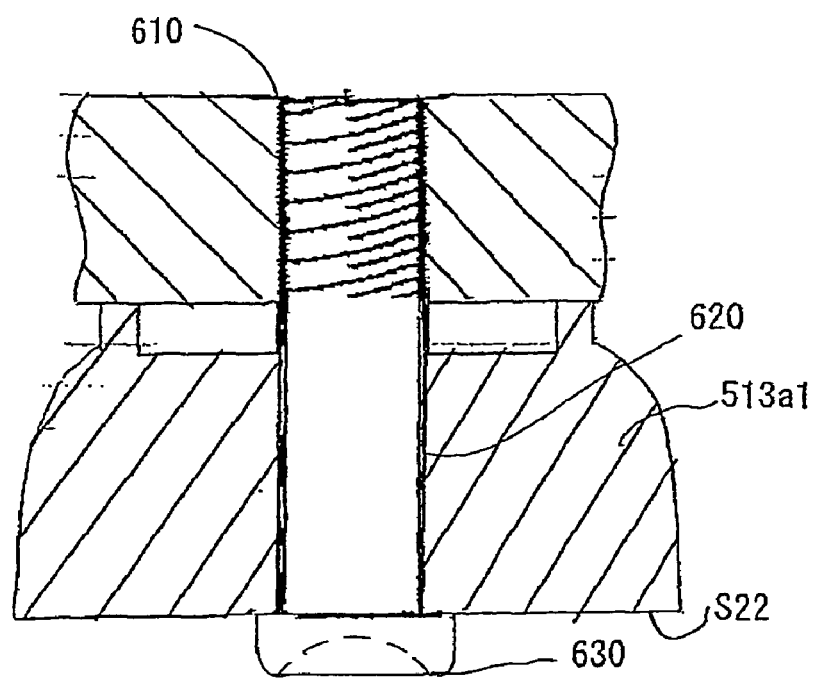
FIG. 6C is an enlarged cross sectional view of a direct joint portion between the terminal block assembly and the positive heatsink of the rectifier according to a modification of the first embodiment.

Specifically, FIG. 6C schematically illustrates an alternative one of the various means for directly fixing the one terminal block 513a1 to the positive heatsink 501.

Referring to FIG. 6C, the positive heatsink 501 is formed with a threaded hole 610 in place of the through hole 550. The terminal block assembly 513 is also formed with a through hole 620 at the one terminal block 513a1 in alignment with the threaded hole 610 in place of the projection 540.

The rectifier 5 is provided with a threaded bolt 630. The threaded bolt 630 is inserted via the through hole 620 in the threaded hole 610 from the other end surface side of the one terminal block 513a1 to be fixedly engaged therein. This also directly secures the one terminal block 513a1 to the positive heatsink 501; this one terminal block 513a1 holds the conductive member 514 connected to the one positive rectifying element 502B located closest to the output terminal 506 in all of the positive rectifying elements 502. Thus, the rectifier 5 with the alternative one of the various means achieves the same effect as the rectifier 5 with the one of the various means according to the first embodiment.

Second Embodiment

An alternator 100A according to a second embodiment of the present invention will be described hereinafter. The alternator 100A of the second embodiment has substantially the same structure as that of the alternator 100 of the first embodiment except for some differences described hereinafter. For this reason, like reference characters are assigned to like parts in the alternators according to the first and second embodiments so that descriptions of the parts of the alternator 100A of the second embodiment will be omitted or simplified.

In the alternator 100 of the first embodiment, direct fixation between the one terminal block 513a1 and the positive heatsink 501 prevent the one positive rectifying element 502B from being damaged due to the vibration load applied to the output terminal 506, and maintains, at a high level, the life of the one positive rectifying element 502B.

In the alternator 100A according to the second embodiment, the increase in rigidity at a portion of the positive heatsink 501 close to the output terminal 506 in place of the direct fixation allows achievement of the same effects as the alternator 100 according to the first embodiment.

Figure 7:
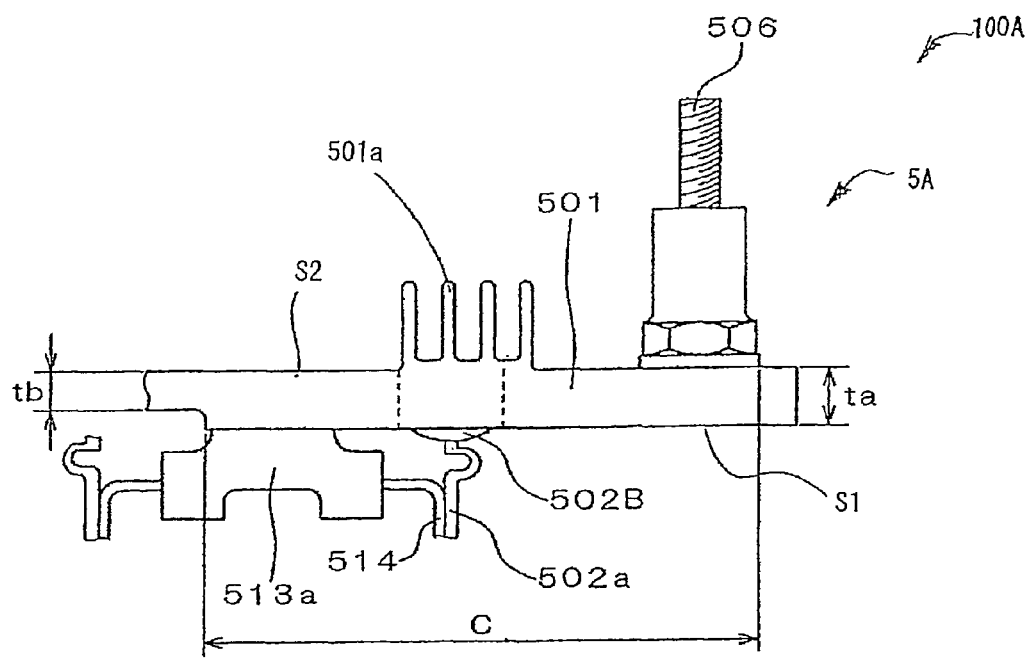
FIG. 7 is an enlarged cross sectional view of a portion of the positive heatsink close to an output terminal of the alternator according to a second embodiment of the present invention.

FIG. 7 schematically illustrates a portion of the positive heatsink 501 close to the output terminal 506. Referring to FIG. 7, a rectifier 5A of the alternator 100A is provided with no through hole 550 formed in the positive heatsink 501 and no projection 540 formed on the terminal block assembly 513.

Specifically, the thickness ta of a portion C of the positive heatsink 501 is greater than the thickness tb of the remaining portion of the positive heatsink 501; this portion C includes the one positive rectifying element 502B located closest to the output terminal 506 in all of the positive rectifying elements 502 and the one terminal block 513a1 that holds the conductive member 514 connected to the one positive rectifying element 502B.

The structure of the rectifier 5A according to the second embodiment reduces the degree of deformation of the portion C of the positive heatsink 501 and the vibration of the portion C during the engine being activated. This makes it possible to prevent the one positive rectifying element 502B from being damaged due to the vibration load applied to the output terminal 506, and maintain, at a high level, the life of the one positive rectifying element 502B.

In the second embodiment, the one terminal block 513a1 can be directly fixed to the portion C of the positive heatsink 501.

This allows, even if the output terminal 506 vibrates during the engine being running, reduction in the difference in vibration phase between the conductive member 514 connected to the lead 502a of the one positive rectifying element 502B and the positive heatsink 501. This also makes it possible to prevent the one positive rectifying element 502B from being damaged due to the vibration load applied to the output terminal 506, and maintain, at a high level, the life of the one positive rectifying element 502B.

Figure 8:
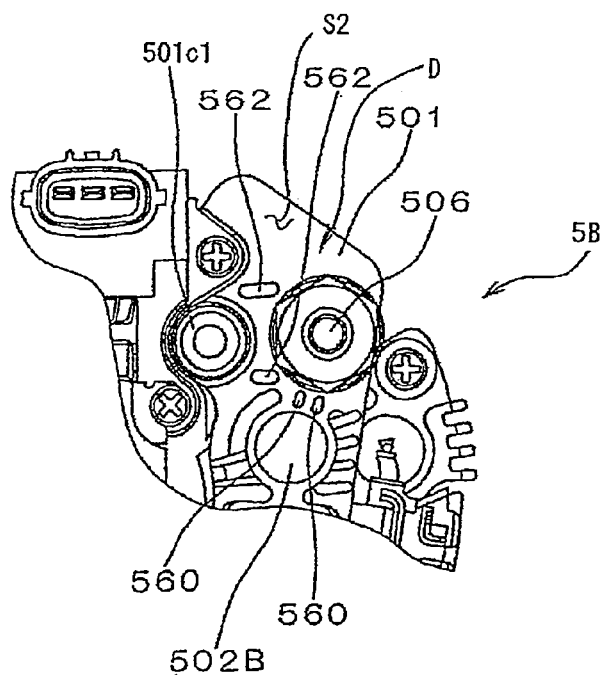
FIG. 8 is a partial plan view of a rectifier installed in the alternator illustrated in FIG. 1 when it is viewed from the rear side thereof with a rear end cover being removed according to a modification of the second embodiment.

As a modification of the second embodiment, FIG. 8 schematically illustrates a portion D of the positive heatsink 501 close to the output terminal 506. Referring to FIG. 8, a rectifier 5B of an alternator 100B is provided with no through hole 550 formed in the positive heatsink 501 and no projection 540 formed on the terminal block assembly 513. The alternator 100B of the modification has substantially the same structure as that of the alternator 100 or alternator 100A except for some differences described hereinafter. For this reason, like reference characters are assigned to like parts in the alternators according to the first or second embodiment and the modification so that descriptions of the parts of the alternator 100B of the modification will be omitted or simplified.

Specifically, the rectifier 5B is formed on the other major surface S2 of the positive heatsink 501 with a plurality of first ribs 560 located between the output terminal 506 and the one positive rectifying element 502B. Each of the first ribs has a width extending along a line connecting between the output terminal 506 and the one positive rectifying element 502B, and a height extending from the other major surface S2 in the axial direction of the rotating shaft 11.

The rectifier 5B is also formed on the other major surface S2 of the positive heatsink 501 with a plurality of second ribs 562 located between the output terminal 506 and one fitting hole 501c1 to be fixed to the rear frame 3b disposed closest to the output terminal 506 in all of the fitting holes 501c. Each of the second ribs has a width extending along a line connecting between the output terminal 506 and the one fitting hole 501c1, and a height extending from the other major surface S2 in the axial direction of the rotating shaft 11.

The structure of the rectifier 5B according to the modification of the second embodiment reduces the degree of deformation of the portion D of the positive heatsink 501 around the output terminal 506 and the vibration of the portion D during the engine being activated. This makes it possible to prevent the one positive rectifying element 502B from being damaged due to the vibration load applied to the output terminal 506, and maintain, at a high level, the life of the one positive rectifying element 502B. Either the first ribs 560 or the second ribs 562 can be formed on the other major surface S2 of the positive heatsink 501 at the portion D around the output terminal 506.

The present invention is not limited to the embodiments and their modifications set forth above, and can be modified within the scope thereof.

Specifically, a rectifier according to the present invention can be provided with at least two of the:

first means configured such that the one terminal block 513a1 is directly fixed to the positive heatsink 501;

the second means configured such that the thickness ta of the portion C of the positive heatsink 501 is greater than the thickness tb of the remaining portion of the positive heatsink 501; and the third means configured to form the first ribs 560 or second ribs 562 on the other major surface S2 of the positive heatsink 501 at the portion D around the output terminal 506.

This makes it possible to, even if a vibration load of an output line connected to the output terminal 506 is carried via the output terminal 506 to act on the portion D of the positive heatsink 501 around the output terminal 506, reduce:

the degree of deformation of the portion D of the positive heatsink 501; and cyclic vibration load; this cyclic vibration load acts on the one rectifying element 502B via its lead 502a and the conductive member 514 connected to the lead 502a due to the vibration load of the output line. Thus, it is possible to further prevent the one positive rectifying element 502B from being damaged due to the vibration load applied to the output terminal 506, and to maintain, at a high level, the life of the one positive rectifying element 502B.

In the modification of the second embodiment, the rectifier 5B is formed on the other major surface S2 of the positive heatsink 501 with a plurality of first ribs 560 located at a portion close to the output terminal 506, and with a plurality of second ribs 562 located at a portion close to the output terminal 506, but the present invention is not limited to the structure. Specifically, the rectifier 5B is formed on the other major surface S2 of the positive heatsink 501 with at least one reinforcing member located at a portion close to the output terminal 506; this reinforcing member works to increase the rigidity of the portion of the output terminal.

In the aforesaid embodiments and their modifications, each of the positive rectifying elements 502 is mounted in a corresponding through hole formed in the positive heatsink 501, and each of the negative rectifying elements 504 is mounted in a corresponding through hole formed in the negative heatsink 503. The present invention is however not limited to the structure.

Specifically, each of the positive rectifying elements 502 can be mounted on one of the major surfaces S1 and S2 of the positive heatsink 501 by, for example, soldering, and each of the negative rectifying elements 504 can be mounted on the major surfaces S11 and S12 of the negative heatsink 503 by, for example, soldering.

In the aforesaid embodiments and their modifications, the output terminal 506 is attached to the other major surface S2 of the positive cooling fin 501 so as to extend from the other major surface S2 in the axial direction of the rotating shaft 11. The present invention is however not limited to the structure.

Specifically, the output terminal 506 can be attached to a portion of the periphery of the positive cooling fin 501 so as to extend in a radial direction of the rotating shaft 11.

In the aforesaid embodiments and their modifications, the present invention is applied to an alternator for vehicles, but the present invention is not limited to the application. Specifically, the present invention can be applied to other types of AC generators installable in other devices.

In the aforesaid embodiments and their modifications, each of the positive and negative heatsinks 501 and 503 has a substantially U and fin shape, but it can have various shapes.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A rectifier for an alternating-current generator installable in a motor vehicle, the rectifier comprising:

an output terminal;

a plurality of pairs of high-side and low-side rectifying elements, one of the high-side rectifying elements and a corresponding one of the low-side rectifying elements of each pair being connected to each other, the plurality of pairs of high-side and low-side rectifying elements working to rectify alternating-current power to direct-current power, the direct-current power being outputted from the output terminal;

a high-side heatsink in which the high-side rectifying elements are mounted so as to provide a common positive terminal, the output terminal being attached to the high-side heatsink;

a low-side heatsink in which the low-side rectifying elements are mounted so as to provide a common negative terminal;

a terminal block assembly including a plurality of terminal blocks integrated with each other, the plurality of terminal blocks holding conductive members; and a fixing mechanism configured to directly fix one of the plurality of terminal blocks to the high-side heatsink, the one of the plurality of terminal blocks holding at least one of the conductive members, the at least one of the conductive members being connected to one of the high-side rectifying elements, the one of the high-side rectifying elements being located closest to the output terminal in all of the high-side rectifying elements, wherein the high-side heatsink has one surface and the one of the plurality of terminal blocks has one surface, the high-side heatsink and the terminal block assembly are arranged such that the one surface of the one of the plurality of terminal blocks is mounted on the one surface of the high-side heatsink, the fixing mechanism comprising:

a projection formed on the one surface of the one of the plurality of terminal blocks toward the high-side heatsink; and a hole formed in the one surface of the high-side heatsink in alignment with the projection, the projection formed on the one surface of the one of the plurality of terminal blocks being fitted in the hole formed in the one surface of the high-side heatsink to thereby directly fix the one of the plurality of terminal blocks to the high-side heatsink.

2. A rectifier for an alternating-current generator installable in a motor vehicle, the rectifier comprising:

an output terminal;

a plurality of pairs of high-side and low-side rectifying elements, one of the high-side rectifying elements and a corresponding one of the low-side rectifying elements of each pair being connected to each other, the plurality of pairs of high-side and low-side rectifying elements working to rectify alternating-current power to direct-current power, the direct-current power being outputted from the output terminal;

a high-side heatsink in which the high-side rectifying elements are mounted so as to provide a common positive terminal, the output terminal being attached to the high-side heatsink;

a low-side heatsink in which the low-side rectifying elements are mounted so as to provide a common negative terminal;

a terminal block assembly including a plurality of terminal blocks integrated with each other, the plurality of terminal blocks holding conductive members; and a fixing mechanism configured to directly fix one of the plurality of terminal blocks to the high-side heatsink, the one of the plurality of terminal blocks holding at least one of the conductive members, the at least one of the conductive members being connected to one of the high-side rectifying elements, the one of the high-side rectifying elements being located closest to the output terminal in all of the high-side rectifying elements, wherein the high-side heatsink has one surface and the one of the plurality of terminal blocks has one surface and an other surface opposite thereto, the high-side heatsink and the terminal block assembly are arranged such that the one surface of the one of the plurality of terminal blocks is mounted on the one surface of the high-side heatsink, the fixing mechanism comprising:

a threaded hole in the high-side heatsink;

a through hole formed in the one of the plurality of terminal blocks in alignment with the threaded hole; and a threaded bolt inserted via the through hole in the threaded hole from the other surface of the one of the plurality of terminal blocks to be fixedly engaged in the threaded hole to thereby directly fix the one of the plurality of terminal blocks to the high-side heatsink.

3. A rectifier for an alternating-current generator installable in a motor vehicle, the rectifier comprising:

an output terminal;

a plurality of pairs of high-side and low-side rectifying elements, one of the high-side rectifying elements and a corresponding one of the low-side rectifying elements of each pair being connected to each other, the plurality of pairs of high-side and low-side rectifying elements working to rectify alternating-current power to direct-current power, the direct-current power being outputted from the output terminal;

a high-side heatsink in which the high-side rectifying elements are mounted so as to provide a common positive terminal, the output terminal being attached to the high-side heatsink;

a low-side heatsink in which the low-side rectifying elements are mounted so as to provide a common negative terminal;

a terminal block assembly including a plurality of terminal blocks integrated with each other, the plurality of terminal blocks holding conductive members; and a fixing mechanism configured to directly fix one of the plurality of terminal blocks to the high-side heatsink, the one of the plurality of terminal blocks holding at least one of the conductive members, the at least one of the conductive members being connected to one of the high-side rectifying elements, the one of the high-side rectifying elements being located closest to the output terminal in all of the high-side rectifying elements, wherein a portion of the high-side heatsink has one surface on which the output terminal is attached, and the one of the plurality of terminal blocks has one surface, the high-side heatsink and the terminal block assembly are arranged such that the one surface of the one of the plurality of terminal blocks is mounted on the one surface of the portion of the high-side heatsink, the portion of the high-side heatsink having a thickness greater than a thickness of a remaining portion of the high-side heatsink.

4. A rectifier for an alternating-current generator installable in a motor vehicle, the rectifier comprising:

an output terminal;

a plurality of pairs of high-side and low-side rectifying elements, one of the high-side rectifying elements and a corresponding one of the low-side rectifying elements of each pair being connected to each other, the plurality of pairs of high-side and low-side rectifying elements working to rectify alternating-current power to direct-current power, the direct-current power being outputted from the output terminal;

a high-side heatsink in which the high-side rectifying elements are mounted so as to provide a common positive terminal, the output terminal being attached to the high-side heatsink;

a low-side heatsink in which the low-side rectifying elements are mounted so as to provide a common negative terminal;

a terminal block assembly including a plurality of terminal blocks integrated with each other, the plurality of terminal blocks holding conductive members;

a fixing mechanism configured to directly fix one of the plurality of terminal blocks to the high-side heatsink, the one of the plurality of terminal blocks holding at least one of the conductive members, the at least one of the conductive members being connected to one of the high-side rectifying elements, the one of the high-side rectifying elements being located closest to the output terminal in all of the high-side rectifying elements; and a reinforcing member mounted on a portion of the high-side heatsink close to the output terminal and working to increase rigidity of the portion of the high-side heatsink close to the output terminal.

5. A rectifier for an alternating-current generator installable in a motor vehicle, the rectifier comprising:

an output terminal;

a plurality of pairs of high-side and low-side rectifying elements, one of the high-side rectifying elements and a corresponding one of the low-side rectifying elements of each pair being connected to each other, the plurality of pairs of high-side and low-side rectifying elements working to rectify alternating-current power to direct-current power, the direct-current power being outputted from the output terminal;

a high-side heatsink in which the high-side rectifying elements are mounted so as to provide a common positive terminal, the output terminal being attached to the high-side heatsink;

a low-side heatsink in which the low-side rectifying elements are mounted so as to provide a common negative terminal; and a terminal block assembly including a plurality of terminal blocks integrated with each other, the plurality of terminal blocks holding conductive members, wherein a portion of the high-side heatsink has one surface on which the output terminal is attached, and the one of the plurality of terminal blocks has one surface, the high-side heatsink and the terminal block assembly are arranged such that the one surface of the one of the plurality of terminal blocks is mounted on the one surface of the portion of the high-side heatsink, the portion of the high-side heatsink having a thickness greater than a thickness of a remaining portion of the high-side heatsink.

6. The rectifier according to claim 5, further comprising:

a reinforcing member mounted on a part of the portion of the high-side heatsink close to the output terminal and working to increase rigidity of the section of the portion of the high-side heatsink close to the output terminal.

7. A rectifier for an alternating-current generator installable in a motor vehicle, the rectifier comprising:

an output terminal;

a plurality of pairs of high-side and low-side rectifying elements, one of the high-side rectifying elements and a corresponding one of the low-side rectifying elements of each pair being connected to each other, the plurality of pairs of high-side and low-side rectifying elements working to rectify alternating-current power to direct-current power, the direct-current power being outputted from the output terminal;

a high-side heatsink in which the high-side rectifying elements are mounted so as to provide a common positive terminal, the output terminal being attached to the high-side heatsink;

a low-side heatsink in which the low-side rectifying elements are mounted so as to provide a common negative terminal;

a terminal block assembly including a plurality of terminal blocks integrated with each other, the plurality of terminal blocks holding conductive members; and a reinforcing member mounted on a portion of the high-side heatsink close to the output terminal and working to increase rigidity of the portion of the high-side heatsink close to the output terminal.

8. The rectifier according to claim 7, wherein a part of the portion of the rectifier is attached to a frame of the alternating-current generator, and the reinforcing member comprises a reinforcing rib mounted on one surface of the portion of the high-side heatsink and located at least one of:

between the output terminal and one of the plurality of terminal blocks, the one of the plurality of terminal blocks holding at least one of the conductive members, the at least one of the conductive members being connected to one of the high-side rectifying elements, the one of the high-side rectifying elements being located closest to the output terminal in all of the high-side rectifying elements; and between the output terminal and the part of the portion of the high-side heatsink.

* * * * *